United States Patent
Krull et al.

(10) Patent No.: US 6,364,918 B1
(45) Date of Patent: Apr. 2, 2002

(54) HYDROXYL-CONTAINING COPOLYMERS, AND THEIR USE FOR THE PREPARATION OF FUEL OILS HAVING IMPROVED LUBRICITY

(75) Inventors: Matthias Krull; Waltraud Nagel, both of Oberhausen (DE)

(73) Assignee: Clariant GmbH, Frankfurt (DE)

( * ) Notice: Subject to any disclaimer, the term of this patent is extended or adjusted under 35 U.S.C. 154(b) by 0 days.

(21) Appl. No.: 09/594,950

(22) Filed: Jun. 9, 2000

(30) Foreign Application Priority Data

Jun. 17, 1999 (DE) ................................ 199 27 560

(51) Int. Cl.$^7$ ................................ C10L 1/18
(52) U.S. Cl. ................ 44/386; 44/389; 44/393
(58) Field of Search ................................ 44/386

(56) References Cited

U.S. PATENT DOCUMENTS

| | | | |
|---|---|---|---|
| 3,520,852 A | 7/1970 | Pratt et al. | 525/380 |
| 3,899,434 A | 8/1975 | Gardiner | 508/582 |
| 3,915,668 A | 10/1975 | Basalay et al. | 44/393 |
| 4,211,534 A | 7/1980 | Feldman | 44/394 |
| 4,509,955 A * | 4/1985 | Hayashi | 44/62 |
| 4,511,369 A | 4/1985 | Denis et al. | 44/346 |
| 4,670,516 A | 6/1987 | Sackmann et al. | 525/327.6 |
| 4,985,048 A | 1/1991 | Wirtz et al. | 44/394 |
| 5,064,921 A | 11/1991 | Blum et al. | 526/262 |
| 5,186,720 A | 2/1993 | Feustel et al. | 44/351 |
| 5,391,632 A | 2/1995 | Krull et al. | 525/327.6 |
| 6,001,141 A * | 12/1999 | Quigley | 44/330 |

FOREIGN PATENT DOCUMENTS

| | | |
|---|---|---|
| DE | 1 594 417 | 5/1970 |
| DE | 25 19 809 | 11/1976 |
| DE | 43 30 971 | 3/1995 |
| EP | 0 122 195 | 6/1984 |
| EP | 0 153 176 | 8/1985 |
| EP | 0 154 177 | 9/1985 |
| EP | 0 074 208 | 11/1985 |
| EP | 0 320 766 | 6/1989 |
| EP | 0 413 279 | 2/1991 |
| EP | 0 606 055 | 7/1994 |
| EP | 0 635 558 | 7/1994 |
| EP | 0 680 506 | 11/1995 |
| EP | 0 739 970 | 10/1996 |
| EP | 0 831 104 | 3/1998 |
| EP | 0 856 533 | 8/1998 |
| EP | 0 889 113 | 1/1999 |
| FR | 2 528 435 | 12/1983 |
| WO | WO 95/33805 | 12/1995 |
| WO | WO 96/21709 | 7/1996 |

OTHER PUBLICATIONS

Plate & Shibaev, Comb–Like Polymers, Structure and Properties, J. Poly Science, Marcomolecular Revs. 1974., p. 117–253.
Wei D., Spikes H.A., The Lubricity of Diesel Fuels, Wear, 111, No. 2, 1986, p. 214–235.
Chemical Abstract, vol. 64, 1966, 3267F.
Derwent Patent Family Abstract for EP 0 856 533.
PCT Search Report for PCT/EP00/05355.
Derwent Patent Family Abstract for DE Patent No. 43 30 971.
Derwent Patent Family Abstract for FR Patent No. 2 528 435.

* cited by examiner

*Primary Examiner*—Ellen M. McAvoy
(74) *Attorney, Agent, or Firm*—Susan S. Jackson; Scott E. Hanf

(57) ABSTRACT

Oil-soluble copolymers having an OH number of from 10 to 250 and a molecular weight of from 1000 to 100,000 g/mol, obtained from the reaction of a copolymer precursor which comprises structural units of A) from 5 to 95 mol-% of an olefinically unsaturated carboxylic acid or a derivative of such an acid, B) from 5 to 95 mol-% of an olefinically unsaturated compound having at least one hydrocarbon radical containing at least 6 carbon atoms, and, if desired, C) from 0 to 40 mol-% of further structural units selected from the group consisting of $C_1$–$C_6$-alkyl (meth) acrylates, $C_1$–$C_6$-alkyl vinyl esters and $C_2$–$C_6$-olefins, with a reagent, which must carry at least one OH group and which, apart from this OH group, has at least one further functional group which is capable of reacting with the carboxylic acid or the derivative of a carboxylic acid as in component A), where the residual acid number is set to a value below 50 mg of KOH/g of copolymer by addition of the reagent.

14 Claims, No Drawings

HYDROXYL-CONTAINING COPOLYMERS, AND THEIR USE FOR THE PREPARATION OF FUEL OILS HAVING IMPROVED LUBRICITY

BACKGROUND OF THE INVENTION

The present invention relates to amphiphilic copolymers which can be prepared by reacting copolymers of olefinically unsaturated carboxylic acid derivatives and olefinically unsaturated lipophilic monomers with hydroxyl-functional compounds, to their use for improving the lubricity of middle distillates, and to middle distillate fuel oils containing these additives.

Mineral oils and mineral oil distillates which are used as fuel oils generally contain 0.5% by weight or more of sulfur, which causes the formation of sulfur dioxide on combustion. In order to avoid the environmental pollution resulting therefrom, the sulfur content of fuel oils is continually being reduced. The EN 590 standard relating to diesel fuels currently prescribes a maximum sulfur content of 500 ppm in Germany. In Scandinavia, fuel oils containing less than 200 ppm and in exceptional cases containing less than 50 ppm of sulfur are already in use. These fuel oils are generally prepared by hydrorefining the fractions obtained from crude oil by distillation. During the desulfurization, however, other substances which give the fuel oils natural lubricity are also removed. These substances include, inter alia, polyaromatic and polar compounds.

However, it is now been found that the friction- and wear-reducing properties of fuel oils worsen with increasing degree of desulfurization. These properties are frequently so inadequate that signs of corrosion must be expected after only a short time on the materials lubricated by the fuel, for example the distributor injection pumps of diesel engines. The further lowering of the 95% distillation point to below 370° C., in some cases to below 350° C. or below 330° C., which has in the meantime been adopted in Scandinavia, intensifies this problem further.

Approaches which claim to be a solution to this problem have therefore been described in the prior art (so-called lubricity additives).

EP-A-0 680 506 discloses esters of carboxylic acids having 2 to 50 carbon atoms as additives for improving the lubricity of low-sulfur middle distillates containing less than 0.5% by weight of S.

EP-A-0 764 198 discloses additives which improve the lubricity of fuel oils and comprise polar nitrogen compounds based on alkylamines or alkylammonium salts containing alkyl radicals having 8 to 40 carbon atoms.

DE-A-15 94 417 discloses additives for improving the lubricity of oleophilic liquids containing esters of glycols and dicarboxylic acids having at least 11 carbon atoms.

EP-A 0 635 558 discloses diesel oils having sulfur contents of below 0.2% by weight and aromatics contents of below 30% by weight. These diesel oils are mixed with from 100 to 10,000 ppm of $C_1$–$C_5$-alkyl esters of unsaturated straight-chain $C_{12}$–$C_{22}$-fatty acids derived from oilseed as additives.

EP-A-0 074 208 discloses middle and heavy distillates which have been mixed with copolymers of ethylene and oxyalkylated acrylates or ethylene and vinyl esters of saturated and unsaturated carboxylic acids as additives.

EP-A-0 856 533 discloses copolymers based on vinyl esters of carboxylic acids, vinylaromatic hydrocarbons, hydroxyl-functional unsaturated monomers and further polymerizable polymers. The polymers have OH numbers of 110–170 mg of KOH/g and have molecular weights of 1500–8000 g/mol. However, the polymers are used, according to the disclosure content of the document, for the production of surface coatings for paints. Use in connection with fuel oils is not disclosed.

U.S. Pat. No. 3,915,668 discloses terpolymers of ethylene, 10–25% by weight of $C_1$–$C_8$-alkylvinyl esters and 10–30% by weight of dialkylvinylcarbinol and their use for improving the cold-flow properties of crude oils and residual oils. The suitability of such terpolymers for improving the lubricity of distillate fuels is not disclosed. U.S. Pat. No. 3,520,852 discloses hydroxyimides and a process for their preparation by firstly esterifying styrene-maleic anhydride copolymers using alcohols having 1–5 carbon atoms to give hemiesters. The hemiesters are then reacted with hydroxylamines under imidation conditions to give imides. The products obtained are suitable as coatings and casting compositions, but not as additives for fuel oils.

U.S. Pat. No. 5,064,921 discloses hydroxyl-functional polyacrylates which have been imidated using aminoalcohols. They are used as thickeners together with polyisocyanates in polyurethanes.

SUMMARY OF THE INVENTION

The object of the present invention was to find additives which result in an improvement in lubricity in middle distillates which have been substantially freed from sulfur and aromatic compounds. At the same time, these additives should also have a favorable effect on the cold-flow properties of these middle distillates.

Surprisingly, it is been found that novel copolymers which can be prepared by reacting copolymers of ethylenically unsaturated carboxylic acids or derivatives thereof and ethylenically unsaturated compounds containing hydrocarbon groups having at least 6 carbon atoms with reagents carrying OH groups impart the requisite properties to the fuel oils to which they are added as additives.

DESCRIPTION OF THE PREFERRED EMBODIMENTS

The invention thus relates to oil-soluble copolymers having an OH number of from 10 to 350 and a molecular weight of from 500 to 100,000 g/mol, obtained from the reaction of a copolymer precursor which comprises structural units of A) from 5 to 95 mol-% of an olefinically unsaturated carboxylic acid or a derivative of such an acid, B) from 5 to 95 mol-% of an olefinically unsaturated compound having at least one hydrocarbon radical containing at least 6 carbon atoms, and, if desired, C) from 0 to 40 mol-% of further structural units selected from the group consisting of $C_1$–$C_6$-alkyl (meth) acrylates, $C_1$–$C_6$-alkyl vinyl esters and $C_2$–$C_6$-olefins, with a reagent, which must carry at least one OH group and which, apart from this OH group, has at least one further functional group which is capable of reacting with the carboxylic acid or the derivative of a carboxylic acid as in component A), where the residual acid number is set to a value below 150 mg of KOH/g of copolymer by addition of the reagent.

The invention furthermore relates to middle distillate fuel oils having a sulfur content of less than 0.5% by weight which, besides a relatively large proportion of a fuel oil, contain a relatively small proportion of copolymers of the type defined above.

The invention furthermore relates to the use of the copolymers defined herein for improving the lubricity and cold flow properties of middle distillate fuel oils.

In a preferred embodiment of the invention, the copolymer has an OH number of from 20 to 300 mg of KOH/g. In a further preferred embodiment, the copolymer has a mean molecular weight Mw of from 700 to 10,000 g/mol. In a further preferred embodiment, the proportion of the structural units (A) is from 10 to 60 mol-%. In a further preferred embodiment, the residual acid number is less than 20, in particular less than 10 mg of KOH/g. Preferred copolymers have melt viscosities at 140° C. of from 10 to 5000 mPas, in particular from 15 to 1000 mpas, especially from 20 to 500 mPas.

The carboxylic acids and carboxylic acid derivatives which make up the structural units A) of the copolymer precursor are preferably maleic acid, acrylic acid, methacrylic acid, fumaric acid or itaconic acid, or derivatives thereof.

The derivatives of the carboxylic acids are preferably their anhydrides. Particular preference is given to maleic anhydride. In the case of copolymers of maleic anhydride (MAA) with α-olefins, preference is given to alternating copolymers comprising from about 40 to 60 mol-% of MAA and 60–40 mol-% of α-olefin.

In a further preferred embodiment, the carboxylic acid derivatives are esters with alcohols having 1 to 5 carbon atoms.

Preferred comonomers (B) are olefinically unsaturated compounds carrying hydrocarbon radicals having at least 6 carbon atoms, preferably at least 8 carbon atoms, in particular at least 10 carbon atoms (excluding the olefinic group necessary for the polymerization). These hydrocarbon radicals can be linear, branched, cyclic and/or aromatic. Besides hydrocarbon groups, they can also carry secondary amounts of further functional groups containing heteroatoms, such as, for example, nitro, halogen, cyano or amino groups, so long as these do not impair the oil solubility. These are preferably monomers from the following groups:

B1) Vinyl esters of carboxylic acids having at least 6 carbon atoms, such as, for example, vinyl octanoate, vinyl 2-ethylhexanoate, vinyl laurate, vinyl octadecanoate, vinyl neononanoate, vinyl neodecanoate, vinyl neoundecanoate or vinyl neododecanoate.

B2) Esters of ethylenically unsaturated carboxylic acids with alcohols having at least 6 carbon atoms, such as, for example, octyl acrylate, 2-ethylhexyl acrylate, decyl acrylate, dodecyl acrylate, tetradecyl acrylate, hexadecyl acrylate, octadecyl acrylate, oleyl acrylate, eicosyl acrylate and mixtures, such as coconut fatty alkyl, tallow fatty alkyl and behenyl acrylate, and the corresponding esters of methacrylic acid, maleic acid, fumaric acid and itaconic acid.

B3) Alkyl vinyl ethers carrying at least one $C_6$-alkyl radical, such as, for example, octadecyl vinyl ether.

B4) Olefins and vinylaromatic compounds having chain lengths (excluding the olefinic group necessary for the polymerization) of at least 6 carbon atoms, such as, for example, 1-octene, 1-decene, 1-dodecene, 1-tetradecene, 1-hexadecene, 1-octadecene, 1-eicosene, technical grade α-olefin cuts, such as $C_{20}$–$C_{24}$α-olefin, $C_{24}$–$C_{28}$α-olefin and $C_{30+}$-α-olefin, styrene, α-methylstyrene and p-methoxystyrene.

Particularly preferred comonomers (B) are the abovementioned olefinically unsaturated compounds from groups B1) to B4) containing hydrocarbon radicals having at least 8 carbon atoms. Preferably at least 10 mol-%, particularly preferably at least 25 mol-%, especially more than 50 mol-%, of the monomers (B) carry linear hydrocarbon radicals. The proportion of comonomers (B) is preferably from 40 to 90 mol-%.

As further comonomers C), up to 40 mol-% of olefins, such as ethylene, propene, butene, isobutene, pentene, hexene or 4-methylpentene, can be copolymerized.

In order to achieve easier handling of the additives, preferably up to 20 mol-%, in particular up to 10 mol-%, of the comonomers B) and/or, if used, C) contain branched alkyl chains. Oligomers and polymers of lower olefins, such as, for example, polypropylene, polybutene and polyisobutylene, are also suitable here, preference being given to those having a high content of terminal double bonds (>50 mol-%, preferably >70 mol-%, in particular >75 mol-%).

The K values (measured by the Ubbelohde method in toluene solution) of the copolymers are preferably less than 100, in particular from 5 to 50, especially from 5 to 30. For the purposes of the invention, "oil-soluble" is taken to mean that at least 10% by weight, preferably at least 1% by weight, in particular at least 0.1% by weight, of the additive forms a clear solution in the middle distillates to which the additive is to be added.

The copolymerization of the copolymers is carried out by known batch or continuous polymerization processes (cf. in this respect, for example, Ullmanns Encyclopädie der Technischen Chemie [Ullmann's Encyclopaedia of Industrial Chemistry], 5th Edition, Vol. A21, pages 305 to 413). Suitable polymerizations are in solution, in suspension, in the gas phase, and precipitation and bulk polymerization. Preference is given to bulk and solution polymerization. The reaction of the comonomers is initiated by free radical-forming initiators (free-radical chain initiators). This class of substances includes, for example, oxygen, hydroperoxides, peroxides and azo compounds, such as cumene hydroperoxide, t-butyl hydroperoxide, dilauroyl peroxide, dibenzoyl peroxide, bis(2-ethylhexyl) peroxydicarbonate, t-butyl permaleate, t-butyl perpivalate, t-butyl perbenzoate, dicumyl peroxide, t-butyl cumyl peroxide, di(t-butyl) peroxide, 2,2'-azobis(2-methylpropionitrile) and 2,2'-azobis-(2-methylbutyronitrile). The initiators are employed individually or as a mixture of two or more substances in amounts of from 0.01 to 20% by weight, preferably from 0.055 to 10% by weight, based on the copolymer mixture.

The polymerization is generally carried out at temperatures of 40–300° C., preferably at 80–250° C., it being advantageous to work under pressure if monomers and/or solvents having boiling points below the polymerization temperature are used. The polymerization is advantageously carried out with exclusion of air, for example under nitrogen, since oxygen has an adverse effect on the polymerization. When selecting the initiator or initiator system, it is advantageous to ensure that the half-value period of the initiator or initiator system is less than 3 hours at the selected polymerization temperature. It is preferably between 0.5 minute and one hour.

The desired molecular weight of the copolymers is obtained for a given composition of the comonomer mixture by varying the reaction parameters concentration and temperature. In order to produce low-molecular-weight copolymers, it is furthermore possible to add moderators. Suitable molecular weight regulators are, for example, aldehydes, ketones, alcohols and organosulfur compounds, such as mercaptoethanol, mercaptopropanol, mercaptoacetic acid, mercaptopropionic acid, tert-butyl mercaptan, n-butyl mercaptan, n-octyl mercaptan, tert-dodecyl mercaptan and n-dodecyl mercaptan. Depending on the target viscosity, the moderators are used in amounts of up to 20% by weight, preferably from 0.05 to 10% by weight, based on the copolymer mixture.

Suitable apparatuses for the polymerization are, for example, conventional stirred reactors having, for example, anchor, paddle, impeller and multi-stage impulse countercurrent agitators, and for continuous preparation stirred reactor cascades, stirred reactors or static mixers.

Besides solvent-free bulk polymerization, the preferred process for the preparation of the copolymers according to the invention is solution polymerization. It is carried out in the solvents in which the monomer and the copolymers formed are soluble. Suitable solvents here are all those which satisfy this criterion and do not undergo any reactions with the monomers and the copolymers formed. These are, for example, organic, preferably aromatic solvents, such as cumene, toluene, xylene, ethylbenzene or alternatively commercial solvent mixtures, such as ®Solvent Naphtha, ®Shellsol AB or ®Solvesso 150 or 200.

In the preparation, all monomers can be initially introduced and polymerized by addition of a free-radical chain initiator and supply of heat.

However, it is advantageous to initially introduce the solvent and, if desired, a part-amount of the monomers (for example about 5–20%) and to meter the remainder of the monomer mixture in together with the initiator and, if used, co-initiator and regulator.

The concentration of the monomers to be polymerized is from 20 to 95% by weight, preferably from 50 to 90% by weight.

The solid copolymer can be isolated by precipitation using suitable non-solvents, such as acetone or methanol, or by evaporation of the solvent. However, it is advantageous to select a solvent for the polymerization in which the polymer can be further processed directly in accordance with the invention.

In order to prepare the copolymers according to the invention, the polymeric acid groups are reacted with at least bifunctional reagents carrying at least one OH function. The binding to the polymer can take place via hydroxyl groups as esters and/or via primary or secondary amino groups in the form of amides, imides and/or ammonium salts. In order to avoid crosslinking it is possible to work, for example, with an excess of bifunctional reagent and/or in high dilution. The esterification, amidation or imidation is generally carried out with removal of water of reaction (azeotropic distillation, expulsion using a gas stream, such as $N_2$). During this reaction, the residual acid number is set to values of <150, preferably <20, in particular <10 mg of KOH/g. Examples of suitable reagents are ethylene glycol, propylene glycol, diethylene glycol, triethylene glycol, trimethylolpropane, mixed alkoxides of ethylene oxide, propylene oxide and/or butylene oxide with up to 50, in particular up to 10 units derived from ethylene oxide, propylene oxide and/or butylene oxide, glycerol, pentaerythritol, sorbitol, ethanolamine, diethanolamine, triethanolamine, butyidiethanolamine, methyidiisopropanolamine, aminopropanediol and alkoxylated polyamines. The latter can be derived, for example, from ethylenediamine, hexamethylenediamine, diethylenetriamine, triethylenetetramine, tetraethylenepentamine and their higher homologs which have been alkoxylated with from 0.5 to 50 mol, in particular up to 10 mol, of ethylene oxide, propylene oxide and/or butylene oxide per H atom bonded to an N atom. The reaction with the polymer can take place either via an OH group to give the ester or via a primary or secondary amino group to give the amide or imide.

The invention also covers the polymer-analogous reaction of amides or diimides with epoxides, such as, for example, ethylene oxide, propylene oxide and butylene oxide, where the OH group formed remains free.

Preferably, the reaction of the copolymers containing acid groups is carried out at from 30 to 250° C. over the course of from 0.5 to 20 hours. The hydroxyl-functional reagent is reacted here with amounts of preferably from 1 to about 2 mol per mol of copolymerized acid (derivative).

In order to be able to reduce the OH number for a given base polymer or to be able to improve the oil solubility, up to 50 mol-% of the hydroxyl-functional reagent can be replaced by alkylamines and/or alcohols having up to 24 carbon atoms.

The copolymers according to the invention are added to mineral oils or mineral oil distillates in the form of solutions or dispersions containing from 10 to 90% by weight, preferably 20–80% by weight, of the copolymers. Suitable solvents or dispersion media are aliphatic and/or aromatic hydrocarbons or hydrocarbon mixtures, for example benzine fractions, kerosene, decane, pentadecane, toluene, xylene, ethylbenzene or commercial solvent mixtures, such as Solvent Naphtha, ®Shellsol AB, ®Solvesso 150, ®Solvesso 200, ®Exxsol, ®ISOPAR and ®Shellsol D grades. It is furthermore possible to use solvents of native origin, such as fatty acids, as solvent. Examples are triglycerides and fatty acid esters, such as, for example, the methyl ester of rapeseed oil acid. Mineral oils or mineral oil distillates whose lubricity and/or cold-flow properties have been improved by the copolymers contain from 0.001 to 2, preferably from 0.005 to 0.5% by weight of copolymer, based on the distillate.

The copolymers according to the invention can furthermore be used in the form of mixtures consisting of copolymers of the claimed type, but of different qualitative and/or quantitative composition and/or of different viscosity (measured at 140° C.). The mixing ratio (in parts by weight) between the copolymers can be varied over a broad range and can be, for example, from 20:1 to 1:20, preferably from 10:1 to 1:10. In this way, the additives can be matched specifically to individual requirements.

In order to produce additive packages for specific problem solutions, the copolymers according to the invention can also be employed together with one or more oil-soluble co-additives which per se improve the cold-flow properties and/or lubricity of crude oils, lubricating oils or fuel oils. Examples of such co-additives are ethylene copolymers or terpolymers containing vinyl acetate, polar compounds which effect paraffin dispersion (paraffin dispersants), comb polymers, alkylphenol-aldehyde resins and oil-soluble amphiphiles.

Thus, mixtures of the terpolymers with copolymers containing from 10 to 40% by weight of vinyl acetate and from 60 to 90% by weight of ethylene have proven highly successful. In accordance with a further refinement of the invention, the terpolymers prepared in accordance with the invention are employed as a mixture with ethylene-vinyl acetate-vinyl neononanoate or ethylene-vinyl acetate-vinyl neodecanoate terpolymers for improving the flow properties of mineral oils or mineral oil distillates. The terpolymers of vinyl neononanoate or vinyl neodecanoate contain, in addition to ethylene, from 10 to 35% by weight of vinyl acetate and from 1 to 25% by weight of the respective neo compounds. Further preferred copolymers contain, in addition to ethylene and from 10–35% by weight of vinyl esters, 0.5–20% by weight of an olefin, such as diisobutylene, 4-methylpentene or norbornene. The mixing ratio between the terpolymers prepared in accordance with the invention and the ethylene-vinyl acetate copolymers described above or the copolymers of ethylene, vinyl acetate and the vinyl esters of neononanoic acid or neodecanoic acid or the olefin terpolymers is (in parts by weight) from 20:1 to 1:20, preferably from 10:1 to 1:10.

For use as a flow improver and/or lubricity additive, the copolymers according to the invention can furthermore be employed as a mixture with paraffin dispersants. These additives reduce the size of the paraffin crystals and mean that the paraffin particles do not separate out, but instead remain dispersed in colloidal form with significantly reduced sedimentation tendency. Furthermore, they increase the lubricity of the copolymers according to the invention. Paraffin dispersants which have proven successful are oil-soluble polar compounds containing ionic or polar groups, for example amine salts and/or amides obtained by reaction of aliphatic or aromatic amines, preferably long-taking aliphatic amines, with aliphatic or aromatic mono-, di-, tri- or tetracarboxylic acids or anhydrides thereof (cf. U.S. Pat. No. 4,211,534). Other paraffin dispersants are copolymers of maleic anhydride and α,β-unsaturated compounds, which can, if desired, be reacted with primary monoalkylamines and/or aliphatic alcohols (cf. EP 0 154 177), the products of the reaction of alkenylspirobislactones with amines (cf. EP 0 413 279 B1) and, in accordance with EP 0 606 055 A2, products of the reaction of terpolymers based on α,β-unsaturated dicarboxylic anhydrides, α,β-unsaturated compounds and polyoxyalkylene ethers of lower unsaturated alcohols. Alkylphenol-aldehyde resins are also suitable as paraffin dispersants.

Thus, the copolymers according to the invention can be employed as a mixture with alkylphenol-formaldehyde resins. In a preferred embodiment of the invention, these alkylphenol-formaldehyde resins are those of the formula 5

(5)

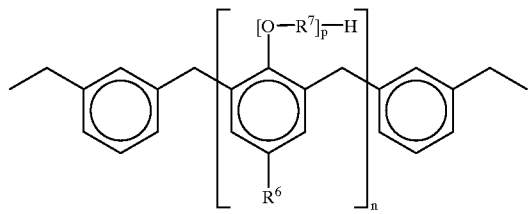

in which $R^6$ is $C_4$–$C_{50}$-alkyl or -alkenyl, $R^7$ is ethoxy and/or propoxy, n is a number from 5 to 100, and p is a number from 0 to 50.

Finally, in a further proven variant of the invention, the copolymers according to the invention are used together with comb polymers. These are taken to mean polymers in which hydrocarbon radicals having at least 8, in particular at least 10, carbon atoms are bonded to a polymer backbone. These are preferably homopolymers whose alkyl side chains contain at least 8 and in particular at least 10 carbon atoms. In the case of copolymers, at least 20%, preferably at least 30%, of the monomers have side chains (Comb-like Polymers—Structure and Properties; N. A. Platéand V. P. Shibaev, J. Polym. Sci. Macromolecular Revs, 1974, 8, 117 ff). Examples of suitable comb polymers are, for example, fumarate-vinyl acetate copolymers (cf. EP 0 153 176 A1), copolymers of a $C_6$- to $C_{24}$-α-olefin and an N—$C_6$- to $C_{22}$-alkylmaleimide (cf. EP 0 320 766), furthermore esterified olefin-maleic anhydride copolymers, polymers and copolymers of α-olefins, and esterified copolymers of styrene and maleic anhydride.

Comb polymers can be described, for example, by the formula

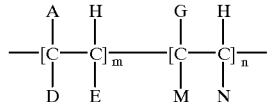

in which
A is R', COOR', OCOR', R"—COOR' or OR';

D is H, $CH_3$, A or R;

E is H or A;

G is H, R", R"—COOR', an aryl radical or a heterocyclic radical;

M is H, COOR", OCOR", OR" or COOH;

N is H, R", COOR", OCOR, COOH or an aryl radical;

R' is a hydrocarbon chain having 8–150 carbon atoms;

R" is a hydrocarbon chain having 1 to 10 carbon atoms;

m is a number between 0.4 and 10; and n is a number between 0 and 0.6.

The mixing ratio (in parts by weight) between the terpolymers prepared in accordance with the invention and paraffin dispersants, resins or comb polymers is in each case from 1:10 to 20:1, preferably from 1:1 to 10:1.

In order to optimize the lubricity, the copolymers according to the invention can be employed as a mixture with further lubricity additives. Lubricity additives which have proven successful are preferably fatty alcohols, fatty acids and dimeric fatty acids, and their esters and partial esters with glycols (in accordance with DE-A-15 94 417), polyols, such as glycerol (in accordance with EP-A-0 680 506 and EP-A-0 739 970) or hydroxylamines (in accordance with EP-A-0 802 961).

The copolymers according to the invention are suitable for improving the lubricating properties and low-temperature properties of animal, vegetable or mineral oils. They are particularly suitable for use in middle distillates. The term "middle distillates" denotes, in particular, mineral oils which are obtained by distillation of crude oil and boil in the range from 120 to 450° C., for example kerosene, jet fuel, diesel and heating oil. The copolymers according to the invention are preferably used in middle distillates which contain 0.5% by weight or less of sulfur, especially preferably less than 500 ppm, in particular less than 200 ppm of sulfur, and in specific cases less than 50 ppm of sulfur. These are generally middle distillates which have been subjected to hydrorefining and contain only small proportions of polyaromatic and polar compounds which give them a natural lubricity. The copolymers according to the invention are furthermore used in middle distillates which have a 95% distillation point of below 370° C., in particular 350° C. and in special cases below 330° C. They can furthermore be employed as a component in lubricating oils.

The polymers can be used alone or alternatively together with other additives, for example with other pour point depressants or dewaxing auxiliaries, with corrosion inhibitors, antioxidants, sludge inhibitors, dehazers and additives for improving the cloud point.

The effectiveness of the copolymers according to the invention as lubricity additives is explained in greater detail by the examples below.

EXAMPLES

Characterization of the Additives Employed

The hydroxyl-functional comonomers are determined by measuring the OH number by reacting the polymer with excess acetic anhydride and then titrating the acetic acid formed with KOH.

The K value is determined by the Ubbelohde method at 25° C. in toluene at a polymer concentration of 5% by weight. All additives are employed as 50% solutions in solvent naphtha or kerosene in order to improve handling.

TABLE 1

Characterization of the additives employed

| Additive | Base polymer | | Derivative | K value | OH No. [mg KOH/g] | Acid No. [mg KOH/g] |
| --- | --- | --- | --- | --- | --- | --- |
| | Comonomer A | Comonomer B | | | | |
| A1 | MAA (0.5 mol) | Octadecene (0.5 mol) | Diethylene glycol diester | 13 | 200 | 145 |
| A2 | MAA (0.5 mol) | Tetradecene (0.2 mol) Hexadecene (0.2 mol) Allyl polyglycol (0.1 mol) | Diethylene glycol diester | 20 | 220 | 8 |
| A3 | MAA (0.5 mol) | Octadecene (0.40 mol) Poly(isobutylene) (0.1 mol) | Diethylene glycol diester | 19 | 160 | 16 |
| A4 | Acrylic acid (0.7 mol) | Stearyl acrylate (0.3 mol) | Diethylene glycol ester | 14 | 175 | 5 |
| A5 | MAA (0.3 mol) | Stearyl acrylate (0.7 mol) | Di(ethanolamide) | 28 | 115 | 7 |
| A6 | Acrylic acid (0.6 mol) | Stearyl acrylate (0.3 mol) Vinyl neodecanoate (0.1 mol) | Glycerol ester | 23 | 310 | 19 |
| A7 | MAA (0.5 mol) | Octadecene (0.5 mol) | Ethylene glycol monoester | 19 | 95 | 120 |
| A8 | MAA (0.5 mol) | Octadecene (0.5 mol) | Di(triethanolamine) ester | 11 | 330 | 9 |
| A9 | MAA (0.5 mol) | Octadecene (0.5 mol) | 2-Hydroxyethylimide | 8 | 125 | 12 |

Table 2: Characterization of the Test Oil

The test oil is a Scandinavian diesel fuel which has been extremely highly desulfurized by hydrosulfonation. The boiling characteristics are determined in accordance with ASTM D-86, the CFPP value in accordance with EN 116 and the cloud point in accordance with ISO 3015.

| | Test oil 1 |
| --- | --- |
| Start of boiling [° C.] | 182 |
| 20% [° C.] | 202 |
| 30% [° C.] | 208 |
| 90% [° C.] | 286 |
| 95% [° C.] | 302 |
| Cloud point [° C.] | −29 |
| CFPP [° C.] | −32 |
| S content [ppm] | 3 |
| Density [g/cm$^3$] | 0.819 |
| Wear scar [μm] | 609 |

Lubricity in Middle Distillates

The lubricity of the additives was measured on additive-containing oils at 60° C. using an HFRR instrument from PCS Instruments. The high frequency reciprocating rig test (HFRR) is described in D. Wei, H. Spikes, Wear, Vol. 111, No. 2, p. 217, 1986. The results are given as coefficient of friction and wear scar. A low coefficient of friction and a low wear scar indicate good lubricity.

TABLE 3

Wear scar in Test Oil 1

| Example | Additive | Wear scar | Film | Friction |
| --- | --- | --- | --- | --- |
| 1 | 200 ppm additive A1 | 319 μm | 78% | 0.18 |
| 2 | 235 ppm additive A2 | 264 μm | 93% | 0.15 |
| 3 | 250 ppm additive A3 | 245 μm | 92% | 0.15 |
| 4 | 200 ppm additive A3 | 343 μm | 79% | 0.19 |
| 5 | 180 ppm additive A4 | 236 μm | 88% | 0.15 |
| 6 | 250 ppm additive A5 | 311 μm | 74% | 0.18 |
| 7 | 260 ppm additive A6 | 362 μm | 80% | 0.16 |
| 8 | 200 ppm additive A7 | 244 μm | 93% | 0.15 |
| 9 | 175 ppm additive A8 | 324 μm | 84% | 0.15 |

List of Trade Names Used

Solvent Naphtha aromatic solvent mixtures having a boiling range of from 180 to 210° C.

®Shellsol AB

®Solvesso 150

®Solvesso 200 aromatic solvent mixture having a boiling range of from 230 to 287° C.

®Exxsol dearomatized solvents in various boiling ranges, for example ®Exxsol D60: 187 to 215° C.

®ISOPAR (Exxon) isoparaffinic solvent mixtures in various boiling ranges, for example ®ISOPAR L: 190 to 210° C.

®Shellsol D principally aliphatic solvent mixtures in various boiling ranges

What is claimed is:

1. An oil-soluble copolymer having an OH number of from 10 to 350 and a molecular weight of from 500 to 100,000 g/mol, obtained from the reaction of a copolymer precursor which comprises structural units of A) from 5 to 95 mol-% of an olefinically unsaturated carboxylic acid or a derivative of such an acid, B) from 5 to 95 mol-% of an olefinically unsaturated compound having at least one hydrocarbon radical containing at least 6 carbon atoms, and, if desired, C) from 0 to 40 mol-% of further structural units selected from the group consisting of $C_1$–$C_6$-alkyl (meth) acrylates, $C_1$–$C_6$-alkyl vinyl esters and $C_2$–$C_6$-olefins, with a reagent, which must carry at least one OH group and which, apart from this OH group, has at least one further functional group which is capable of reacting with the carboxylic acid or the derivative of a carboxylic acid as in component A), where the residual acid number is set to a value below 150 mg of KOH/g of copolymer by addition of the reagent.

2. A copolymer as claimed in claim 1, which has an OH number of from 20 to 300 mg of KOH/g.

3. A copolymer as claimed in claim 1, which has a mean molecular weight Mw of from 700 to 10,000 g/mol.

4. A copolymer as claimed in claim 1, where the proportion of the structural units (A) is from 10 to 60 mol-%.

5. A copolymer as claimed in claim 1, where the residual acid number is below 20 mg of KOH/g.

6. A copolymer as claimed in claim 1, where the structural units A) are derived from maleic acid, acrylic acid, methacrylic acid, fumaric acid or itaconic acid, or derivatives thereof.

7. A copolymer as claimed in claim 1, in which the comonomers (B) are olefinically unsaturated compounds carrying linear, branched, cyclic and/or aromatic hydrocarbon radicals having at least 6 carbon atoms (excluding the olefinic group necessary for the polymerization).

8. A copolymer as claimed in claim 1, in which the comonomers C) are selected from the group consisting of ethylene, propene, butene, isobutene, pentene, hexene and 4-methylpentene.

9. A copolymer as claimed in claim 1, which has a melt viscosity at 140° C. of from 10 to 5000 mPas.

10. A fuel oil composition comprising a relatively large amount of a middle distillate fuel oil having a sulfur content of below 0.5% by weight and a relatively small amount of a copolymer as claimed in claim 1.

11. A method of using a copolymer as claimed in claim 1 for improving lubricity and cold flow properties of middle distillates comprising adding the copolymer to a fuel oil.

12. The copolymer as claimed in claim 1, where the residual acid number is below 10 mg of KOH/g.

13. The copolymer as claimed in claim 1, in which the comonomers (B) are olefinically unsaturated compounds carrying linear, branched, cyclic and/or aromatic hydrocarbon radicals having at least 8 carbon atoms (excluding the olefinic group necessary for the polymerization).

14. The copolymer as claimed in claim 1, in which the comonomers (B) are olefinically unsaturated compounds carrying linear, branched, cyclic and/or aromatic hydrocarbon radicals having at least 10 carbon atoms (excluding the olefinic group necessary for the polymerization).

* * * * *